United States Patent [19]
Schmid et al.

[11] 3,749,431
[45] July 31, 1973

[54] UNIVERSAL JOINT CONSTRUCTION

[75] Inventors: Eckhardt Schmid, Guglingen; Alfred Kohler, Bietigheim, both of Germany

[73] Assignee: SWF-Spezialfabrik Fur Autozubehor Gustav Rau GmbH, Bietigheim, Germany

[22] Filed: Mar. 22, 1972

[21] Appl. No.: 237,110

[30] Foreign Application Priority Data
Apr. 8, 1971 Germany .................. P 71 13 623.7

[52] U.S. Cl. .............................................. 287/90 R
[51] Int. Cl. ............................................. F16c 11/06
[58] Field of Search ..................... 287/88, 87, 90 R, 287/90 C

[56] References Cited
UNITED STATES PATENTS

| | | | |
|---|---|---|---|
| 3,290,073 | 12/1966 | Gottschold | 287/90 R |
| 2,053,583 | 9/1936 | Summers | 287/90 R |
| 3,506,290 | 4/1970 | Gottschold | 287/87 |
| 3,097,005 | 7/1963 | Fickler | 287/90 R |
| 2,999,708 | 9/1961 | Dudash | 287/87 |

FOREIGN PATENTS OR APPLICATIONS

| | | | |
|---|---|---|---|
| 1,486,836 | 5/1967 | France | 287/90 R |
| 217,804 | 10/1958 | Australia | 287/90 R |

*Primary Examiner*—Andrew V. Kundrat
*Attorney*—John J. McGlew et al.

[57] ABSTRACT

A universal joint includes a socket preferably of a polyurethane plastic material having an exterior surface with an annular groove which is engaged into a slot of a receiving rod with the surface of the rod bounding the slot being engaged in the groove and with the socket being held against rotation by the projection of a web element into a recess of the groove. The joint includes a ball member carried on a pin of a lever or drive crank and which is advantageously formed of a polyurethane plastic and which is held on the pin against rotation by a hexagonal collar portion of the pin and held gainst removal by a snap-fit of a bead portion into a groove defined on the pin. The socket also includes a bellows-like lower extension which extends downwardly over the base of the ball member and engages into an annular groove of the ball member.

2 Claims, 2 Drawing Figures

UNIVERSAL JOINT CONSTRUCTION

BACKGROUND OF THE INVENTION

1. Field of the Invention

This invention relates in general to the construction of universal joints and, in particular, to a new and useful universal joint including a socket member having an exterior annular groove for engagement in a slot of an associated rod and a ball member carried on a lever or crank drive having an annular groove which is engaged by a bellows-like formation of the socket member.

2. Description of the Prior Art

The invention relates to the universal joint for connecting a lever with at least one joint rod and in which the pin is fastened to the lever and the spherical socket is fastened to the joint rod in a construction which is particularly applicable for the drives of windshield wipers for motor vehicles. In such an arrangement, the lever constitutes the drive crank in the joint rod part of the windshield wiper linkage. In the known spherical joints of this type, there is used a cylindrical steel pin which is fastened on the lever and a spherical cap which is fastened on the joint rod by means of a thin plate and two rivets. Another known spherical joint comprises a turned steel spherical pin which is fastened on the lever and a plastic spherical socket which is extruded directly on the joint rod. These, and similar constructions, are not protected against dust and splash water and are relatively difficult to produce.

SUMMARY OF THE INVENTION

In accordance with the invention, there is provided a spherical joint which is protected from dust and splash water and which may be manufactured inexpensively and is suitable, not only as a single, but also as a double joint. The inventive construction provides a cylindrical pin on a lever or drive crank, for example, which includes a ball comprising a spherical oart of elastic material which is secured over the pin in a non-rotatable manner by interengagement of a projection on the top side of the ball into an annular groove defined on the upper or outer end of the pin. The ball member also includes a skirt portion having an annular groove which accommodates the end of a bellows formation of an integrally formed socket member which is fitted over the ball part. The construction results in a closed-off dust and splash-proof construction which is simply and easily made of two interengageable parts which are advantageously both made of a polyurethane plastic. The housing formed by the socket member and the depending skirt bellows which engages in a groove on the skirt of the ball member is sufficiently sealed and closed to permit the addition of lubricant to the joint without any leakage. The spherical ball and the spherical socket can be easily produced in mass production.

The inventive construction advantageously includes a hexagonal base formation of the holding pin for the ball member which engages into similar hexagonal recess of the ball and prevents rotation thereof. The outer part of the ball is held by engagement of an inner annular surface of the receiving bore for the pin into an annular groove of the pin.

The invention may also be embodied in a double joint construction in which the pin is covered by a ball member having two ball portions arranged in axial side-by-side arrangement. In this construction, the socket housing for the outermost ball is opened on its end but engages into an annular groove of an intermediate socket member which is disposed around the lowermost ball. The intermediate socket member also includes a bellows-like skirt which engages into a groove which is formed at the base or skirt of the ball member. The construction is such that the spherical socket which is usable for a single ball joint may be used for a double ball joint as a covering for the outermost ball portion. A simpler construction is achieved, however, if the diameter of one ball is smaller than that of the other ball.

Accordingly it is an object of the invention to provide an improved universal joint construction which includes a ball receiving socket member which is engageable in a receiving slot of a first part, and a ball member which is carried on a second part and which engages into the receiving socket; and wherein the receiving socket includes a skirt portion in a bellows-like form which has an end which engages in an annular groove on a base of the ball member to provide a seal therewith.

A further object of the invention is to provide a universal joint construction which may comprise a single or double ball socket joint with the receiving socket member being formed to engage with a bellows-like skirt into an intermediate socket member or into the base of the ball member in a sealing engagement.

A further object of the invention is to provide a universal joint construction which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

GENERAL DESCRIPTION OF THE PREFERRED EMBODIMENTS

Figure 1:
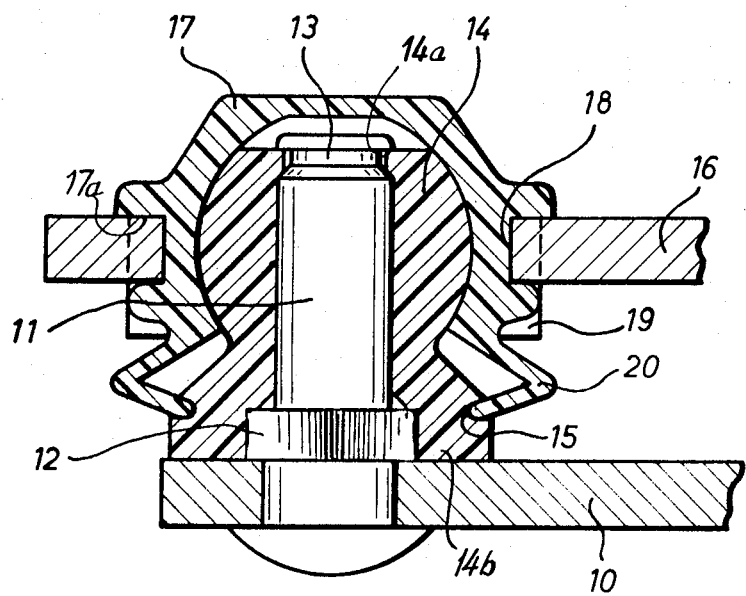
FIG. 1 is an axial sectional view of a universal joint constructed in accordance with the invention.

Referring to the drawings in particular, the invention embodied therein in FIG. 1, comprises a universal joint construction for a windshield wiper mechanism of an automobile which includes a first operable part, such as a crank drive or lever 10, which carries a mounting pin 11 for a ball member 14 and a second operating part, such as a rod of a windshield wiper 16, which is provided with a slot 18 which engages around the periphery of a socket member 17.

In accordance with the invention, the pin 11 which may for example be made of a metal material, includes a base or collar 12, of hexagonal form, which is fitted into a hexagonal recess of a ball or spherical part 14 which is advantageously made of a polyurethane plastic. The ball 14 includes a receiving bore for the pin 11 which has an inwardly extending lip or projection 14a which engages into an annular groove 13 of the pin 11 and maintains the ball in position. The hexagonal base 12 ensures that the ball 14 does not rotate in respect to the pin 11. The ball 14 also includes a skirt or base 14b which has an annular groove 15 which defines an engagement recess for receiving the end of a bellows-like extension or skirt 20 of the socket member 17.

The socket member 17 includes an annular groove 17a which engages the material of the rod 16 around the slot 18 and projecting web portions 19 in the groove 17a engaged into comparable recesses of the slot 18 and hold the socket 17 against rotation relative to the rod 16.

Both the socket 17 and the ball 14 are advantageously made of a polyurethane plastic material and the interengagement of the bellows 20 into the groove 15 provides a sealed joint which is dust and waterproof.

Figure 2:
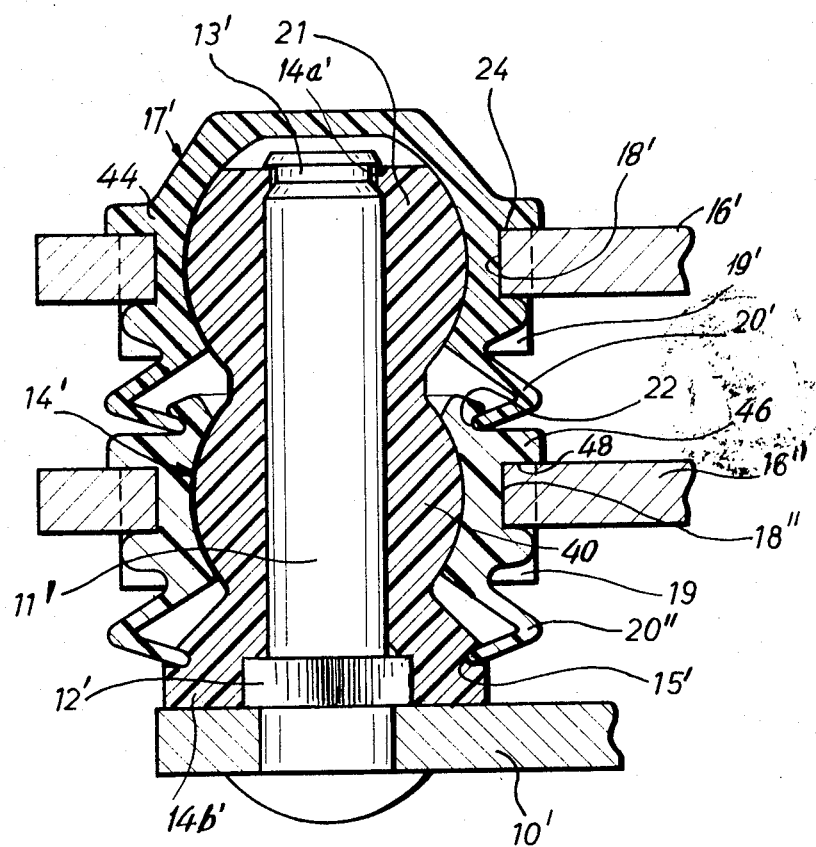
FIG. 2 is a view similar to FIG. 1 of another embodiment of the invention.

In the construction shown in FIG. 2, similar parts are similarly designated, but with a prime. In this construction, a pin 11' is secured to a rod 10' and it is longer than the pin shown in FIG. 1, but is provided with an annular groove 13' for receiving an annular lip or bead 14a' of a double ball member, generally designated 14'. In this construction, a ball member 14' includes an inner ball portion 40 and an outer ball portion 21. The skirt 14b' is of a construction similar to that of the other embodiment and it includes an annular groove 15' for receiving a bellows-like skirt or extension 20' of the socket member, generally designated 17'.

In the embodiment of FIG. 2, the socket member 17' includes an upper or outer socket portion 44 which may be substantially identical with the socket 17 shown in FIG. 1 and a lower or inner socket portion 46 which is opened at each end.

The outermost ball portion 21 fits into the outermost socket 44. The socket 44 is carried on a rod 16' which has a slot 18' which is received in a socket groove 24. A rod 16'' includes a slot 18'' which is engaged into an annular groove 48 of the lower socket housing 46. The lower socket housing 46 accommodates the inner ball portion 40.

The outer socket 17' includes the bellows-like extension 20' which engages in an annular groove 22 of the inner socket 46. The inner socket includes a bellows-like extension or skirt 20'' which engages in the annular recess 15' defined in the base portion 14b' of the ball member, generally designated 14'. The spherical socket 17 illustrated in FIG. 1 can be used as an upper spherical socket in the double joint construction of FIG. 2. The pin 11' includes a hexagonal base part 12' which engages in a hexagonal recess of the ball member 14' in a manner similar to the first embodiment. This ensures that there will be no rotation of the ball member 14' in respect to the pin 11'.

While specific embodiments of the invention have been shown and described in detail to illustrate the application of the inventive principles, it will be understood that the invention may be embodied otherwise without departing from such principles.

What is claimed is:

1. A universal joint construction comprising a hollow ball-receiving socket having at least one axial end opening, a ball assembly engaged in said socket and extending through the axial end opening and including a central ball pin and a spherical ball member extending over said pin and including a spherical ball portion in said socket and a lower portion extending through said axial end opening and having a groove extending therearound, said socket having a bellows-like skirt terminating in an edge extending into the groove of said lower portion and sealing the end of said socket with said ball member, said pin including an outer end having an annular groove therein, said ball member including a bore into which said pin extends which has an inwardly projecting head engaged in said annular groove of said pin.

2. A universal joint construction comprising a hollow ball-receiving socket having at least one axial end opening, a ball assembly engaged in said socket and extending through the axial end opening and including a central ball pin and a spherical ball member extending over said pin and including a spherical ball portion in said socket and a lower portion extending through said axial end opening and having a groove extending therearound, said socket having a bellows-like skirt terminating in an edge extending into the groove of said lower portion and sealing the end of said socket with said ball member, said pin including a lower portion having a hexagonal collar, said ball member lower portion having a hexagonal recess engaging around said collar and preventing relative rotation of said ball member relative to said pin, a crank lever connected to said pin and a rod connected around said socket.

* * * * *